United States Patent [19]

Merideth

[11] 4,029,118

[45] June 14, 1977

[54] TAPPING APPARATUS AND METHOD

[75] Inventor: John H. Merideth, Dallas, Tex.

[73] Assignee: Phillips Petroleum Company, Bartlesville, Okla.

[22] Filed: July 3, 1975

[21] Appl. No.: 593,091

[52] U.S. Cl. .............................. 137/15; 29/157 T; 29/235; 29/237; 29/407; 29/453; 137/318; 408/87; 408/137

[51] Int. Cl.² .................. F16K 43/00; F16L 55/10

[58] Field of Search ............ 137/15, 315, 317, 318; 408/87, 92, 137; 29/235, 237, 157 T, 407, 453

[56] References Cited

UNITED STATES PATENTS

| 2,964,290 | 12/1960 | Mueller | 137/318 |
|---|---|---|---|
| 3,307,435 | 3/1967 | Floren | 137/318 |
| 3,336,937 | 8/1967 | Ehrens et al. | 137/318 |
| 3,349,792 | 10/1967 | Larkin | 137/318 |
| 3,428,075 | 2/1969 | Wagner | 137/318 |
| 3,734,112 | 5/1973 | Finney et al. | 137/318 |
| 3,756,261 | 9/1973 | Minchhoff | 137/318 |
| 3,863,667 | 2/1975 | Ward | 137/318 |

Primary Examiner—Martin P. Schwadron
Assistant Examiner—G. L. Walton

[57] ABSTRACT

A tapping apparatus and method is provided whereby a sleeve having at least one annular groove around the circumference thereof and an outwardly extending flange at one end thereof is, during the cutting of an opening in the wall of a conduit, carried by the cutter to a position at which the at least one angular groove is located within the cut opening and is engaged by the conduit material surrounding the opening to maintain the sleeve in a fixed position relative to the conduit, and wherein the outwardly extending flange contacts a portion of the tapping means for maintaining the tapping means in a fixed relationship to the tapped conduit.

18 Claims, 4 Drawing Figures

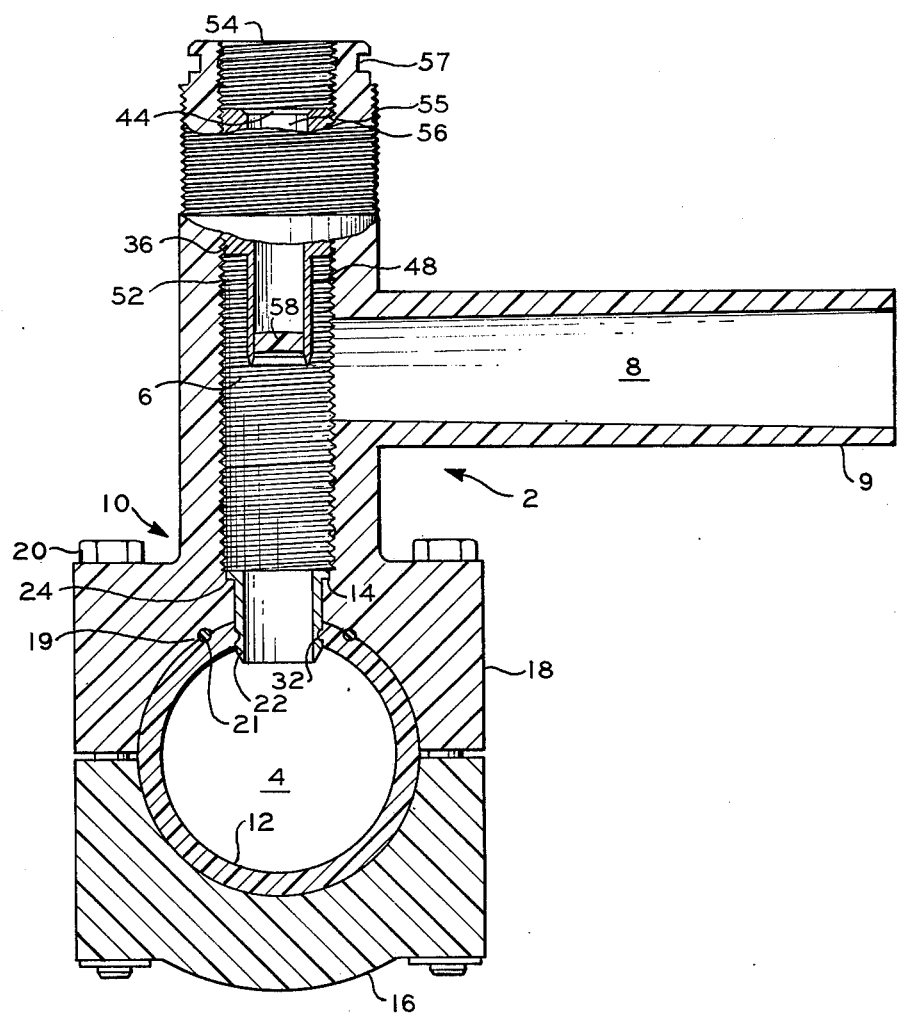
FIG. 1
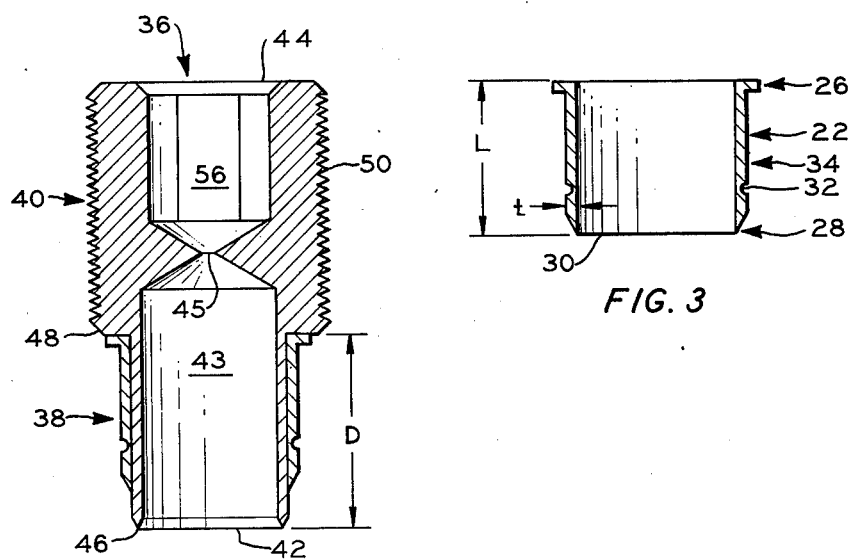
FIG. 2
FIG. 3

TAPPING APPARATUS AND METHOD

This invention relates to an apparatus and method for tapping a conduit. In another aspect it relates to an apparatus and method for maintaining a tapping means in a fixed location with respect to a tapped conduit. In still another aspect it relates to method and apparatus for tapping a plastic conduit. In another aspect the invention relates to a tapping tee means and its method of use. In yet another aspect the invention relates to a tapping apparatus and method employing a cutting means adapted to permit fluid communication therethrough.

When it is necessary to connect one end of a conduit to a central portion of an existing conduit means, it is desirable to use an apparatus and method whereby the completed connection between the two conduits will resist movement of the coupling apparatus used, both horizontally along the tapped pipe and rotationally around the tapped pipe. For example, for an underground service line connection to an underground main conduit, such movement can generally be caused by the main line or the service line being displaced from its original position by uneven earth settlement around the lines, by uneven compaction of the backfill in the ditch in which the lines are buried, by heavy traffic on or over the buried conduits, or by other forces such as earth-moving equipment working in or near the area.

The method ordinarily utilized to tap a conduit for such purposes is to clamp or otherwise affix a tee means to the main conduit, connect the output end of the tee means to the service line which is to be connected to the main conduit, then form an opening in the main conduit to permit communication with the service line. Forming such an opening can be accomplished by use of a rotating cutter means which is carried by threads on an inside wall of the tee means into contact with and through the wall of the main conduit. Apparatus and methods heretofore utilized for this purpose have depended upon upsetting the plastic material of the main conduit adjacent the thus-cut opening to prevent subsequent movement of the tee means with respect to the main conduit or have left a portion of the cutting means including the sharp cutting surface extending through the wall of the main conduit to prevent subsequent misalignment of the cut hole and the tee means. The techniques dependent upon the use of upset main conduit material to maintain a proper alignment have the disadvantage of depending upon material which has been weakened and disturbed from its original position in a largely uncontrolled manner. Difficulties are therefore encountered in obtaining uniform upsetting and reliable operation with various plastic materials which may react differently to the upsetting forces applied to them. The technique of leaving a portion of the cutter in place, extending through the wall of the main conduit after a hole has been cut, provides reliable resistance to relative movement between the tapping tee means and the main conduit but undesirably requires the use of a separate cutting tool for each line tap. The cutting tool must be formed of relatively expensive steel and is necessarily machined to form a cutting edge and to form threads or such other necessary features as may be required.

Therefore, an object of the invention is to provide an apparatus and method for tapping a conduit. Another object is to provide an apparatus and method for maintaining a tapping means in a fixed location with respect to a tapped conduit. Still another object is to provide a method and apparatus for tapping a plastic conduit. Yet another object of the invention is to provide a tapping tee means and its method of use. Another object of the invention is to provide a tapping apparatus and method employing a cutting means adapted to permit fluid communication therethrough.

In accordance with the invention, there is provided a tapping tee which has a body having first, second, and third communicating passageways with a seat formed on a first end portion of the second passageway, a sleeve having an outwardly extending flange, and means suitably positioned within the second passageway and being movable therethrough in a first direction for cutting and removing a portion of a conduit positioned within the first passageway and fixedly inserting the sleeve within the cut opening with the sleeve flange in contact with the seat, and being movable in a second direction for disengaging from the sleeve and moving to a second end portion of the second passageway.

Other objects and advantages of the invention will be apparent from the appended claims thereto and from the drawing and detailed description thereof illustrating a preferred embodiment of the invention.

The drawings are diagrammatic views of a preferred apparatus of the invention wherein:

FIG. 1 is a partial sectional view of an apparatus in accordance with one embodiment of the invention;

FIG. 2 is a sectional view of the cutter and sleeve of the apparatus;

FIG. 3 is an enlarged sectional view of the sleeve of the apparatus; and

Figure 4:
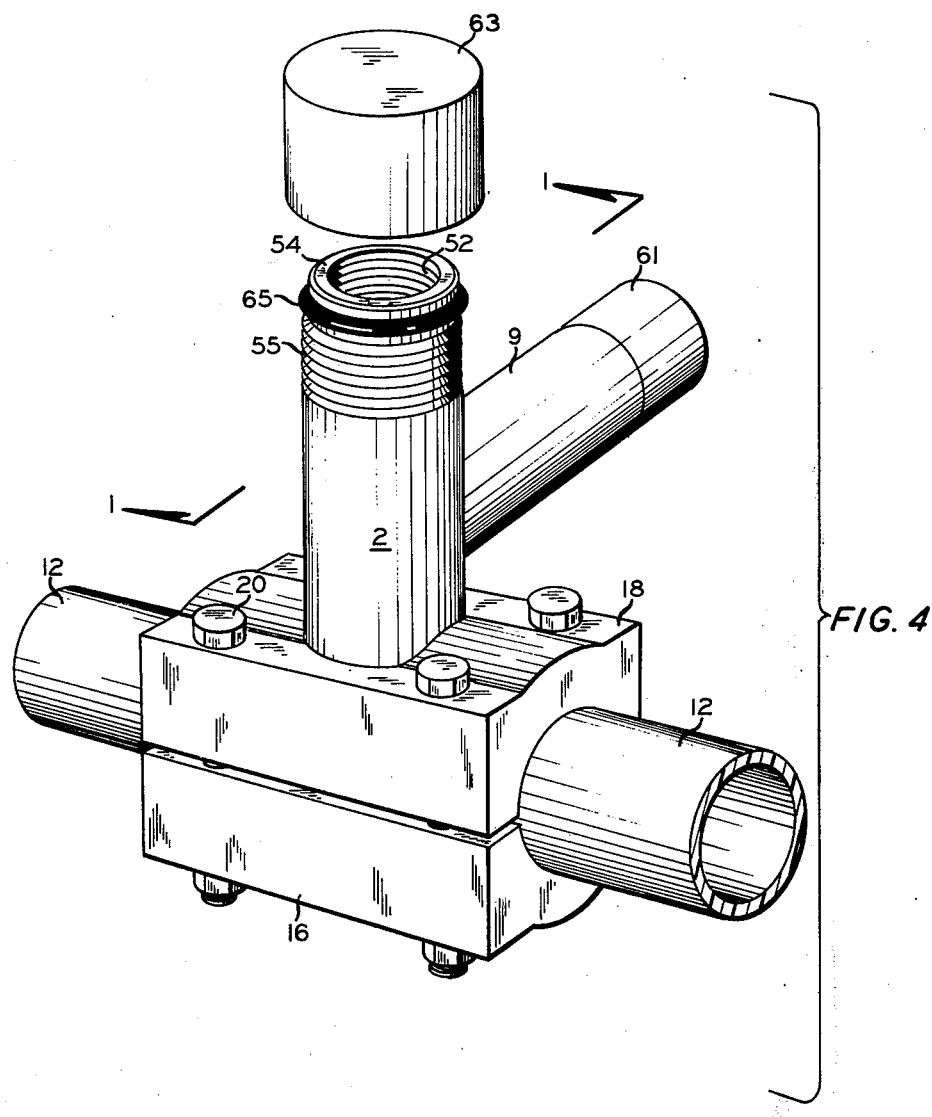
FIG. 4 is a partially exploded perspective view of the apparatus in place connecting a service conduit with a main conduit.

Referring to the drawings, a tapping tee body 2 has first, second, and third passageways 4, 6, 8 extending therethrough. The first passageway 4 extends in a first direction and is in communication with the second passageway 6 at a first end portion 10 of the second passageway 6. The central longitudinal axis (not shown) of the second passageway 6 is angularly disposed relative to the central longitudinal axis (not shown) of the first passageway 4. This angle is preferably about 90° but can be other than 90°. The second passageway 6 is in communication with the third passageway 8 at the first end portion 10 of said second passageway 6. The central longitudinal axis (not shown) of the third passageway 8 is angularly disposed relative to the axis of the second passage 6. This angle is preferably about 90° but can be other than 90°.

Therefore, as can be seen in FIG. 1, the third passageway 8 is in communication with the first passageway 4 via a portion of the second passageway 6. The first passageway 4 is constructed to receive a conduit 12 to be tapped by the apparatus and the third passageway 8 provides a stub 9 which is in communication with the associated tapped conduit 12. A service conduit 61 (FIG. 4) connected to the stub 9 communicates with the main conduit 12 through a portion of the second passageway 4 and the stub 9.

A seat 14, preferably an annular seat, is located on the inside wall of the first end portion 10 of the second passageway 6 at a location between the opening to the first passageway 4 and the opening to the third passageway 8. Preferably, the seat 14 is an integral portion of the body 2 formed by a change in the diameter of the second passageway 6.

The first passageway 4 is preferably formed of first and second body portions 16, 18 which are releasably fixed one to the other by suitable means, for example, fasteners or bolts 20 extending through each portion 16, 18. The second body portion 18 has an annular groove 19 about the second passageway on its inner surface for accommodating an O-ring 21 so that the second passageway 6 can be clamped in fluid tight relationship with conduit 12. The first and second body portions 16, 18 can, however, be of other construction. For example, for use with small diameter conduit where pressures are expected to be low, metal straps (not shown) can be used to replace the first body portion 16 and bolts 20.

A sleeve 22, adapted to be slidably mounted around a first end portion 38 of a cutter 36, has a central opening therethrough and an outwardly extending flange 24 and is positioned within the second passageway 6. As better seen in FIG. 3, the sleeve flange 24 is located at a first end portion 26 of the sleeve and the second end portion 28 of the sleeve has a tapered or wedge-shaped edge 30. The tapered edge 30 of the sleeve 22 is tapered so that the point of the tapered or wedge-shaped edge 30 is located along the inside diameter of the sleeve 22 against the first end portion 38 of the cutter 36. The portion of the sleeve extending from the flange 24 to the edge 30 is of a generally cylindrical configuration and has a length L. In order to assure fixedly maintaining the sleeve 22 relative to the conduit 12 into which sleeve 22 is inserted, particularly where said conduit is formed of plastic, it is preferred that the sleeve has at least one annular groove 32 formed on the outer periphery of the body portion 34 of the sleeve 22 at a location spaced from the flange 24 a distance sufficient for the groove to be within the cut opening of the conduit in the installed position of the sleeve 22, as shown in FIG. 1. The exact groove distance from the flange 24 depends upon the construction of the body 2 and the size of the conduit 12 for which the tee is constructed.

The sleeve 22 is preferably formed of metal or other rigid material with a sleeve wall thickness ($t$) being sufficient to provide a tight fit within the hole in the conduit 12 and to provide adequate support to prevent movement of the tee body 2 with respect to the conduit 12, yet thin enough to prevent undesirable deformation of the conduit 12. Wall thicknesses less than about 0.015 inches (3.81 mm) are ordinarily undesirable because the sleeve 22 would tend to deform during insertion or be damaged during impact after installation in many applications. Thicknesses within the range of from about 2 percent to about 10 percent of the outside diameter of the sleeve 22 are generally preferred for sleeves having an outside diameter of up to 1 inch (2.54 cm). Thicknesses greater than about 0.1 inch (25.4 mm) are ordinarily unnecessary, even with larger conduits, to prevent undesirable movement, and greater thicknesses are also undesirable because the sleeve 22 may tend to unnecessarily deform the conduit 12 during insertion thereinto.

A cutter 36 is positioned within the second passageway 6. The cutter 36 has first and second end portions 38, 40, first and second ends 42, 44, a cutting surface 46 formed on the first end 42, a shoulder 48 positioned a preselected distance from said first end 42, and threads 50 (better seen in FIG. 2) formed about the outer periphery of the cutter 36 between the second end 44 and the shoulder 48. The threads 50 are mateable with threads 52 of the second passageway 6 which extend generally from the second end 54 of the second passageway 6 to a location adjacent the seat 14. The second end 54 can have an O-ring groove 57 and outside threads 55 on the body 2 for accommodating a cap 63 (FIG. 4) in a sealing or fluid tight relationship. The threads 50, 52 are of a type for moving the cutter 36 and associated sleeve 22 through the second passageway 6 and can form a fluid tight seal in the second passageway 6. A tubular passageway 43 extends from the first end 42 to a small opening 45 in the bottom of hexagonal shaped tool socket 56 for providing a means for testing the service lines connected to stub 9 prior to cutting a hole in the main conduit 12.

FIG. 4 illustrates a tapping tee body 2 which has been affixed to a main conduit 12 by means of the first and second body portions 16, 18 associated with the tapping tee body 2 by tightening the bolts 20 extending through the first and second body portions 16, 18. A service conduit 61 has been connected to the stub 9 by butt welding the end of the stub 9 to the end of the service conduit 61 or by any other suitable means. With the cutter 36 having already been used in conjunction with the threads 52 of the second passageway to cut a hole in the conduit 12 and having subsequently been removed from the tapping tee body 2, a cap 63 is ready to be applied to the tee body 2 in order to seal the second end of the second passageway. Sealing of the passageway is accomplished by the mating of inside threads of the cap 62 with the threads 55 of the tee body 2, as well as by contact between an O-ring 65 seated within the O-ring groove 57 (FIG. 1) which contacts an inside surface of the cap 63.

Referring to FIG. 2, the distance D between the cutter shoulder 48 and the cutter first end 42 is greater than the length L of the sleeve. Preferably, the relationship between D and L is such that the cutter first end 42 passes completely through a wall of the conduit 12 before sleeve 22 comes in contact with the conduit 12 and sleeve 22 has a length L greater than the wall thickness of the conduit 12 being tapped. These dimensions and others mentioned herein are easily determined by one skilled in the art after the size of conduit 12 for which the tee is constructed has been established.

An example apparatus of this invention has dimensions as follows:

Example

| | |
|---|---|
| Conduit 12, O.D. | 2.375" (6.033 cm) |
| Conduit 12, I.D. | 1.943" (4.935 cm) |
| First passageway 6, diameter | 1" - 14 NF Internal Thread |
| Sleeve length, "L" | .605" (1.537 cm) |
| Sleeve thickness, "t" | .035" (8.89 mm) |
| Sleeve body, O.D. | .750" (1.905 cm) |
| Sleeve flange, O.D. | .865" (2.197 cm) |
| Cutter fist end portion 38, O.D. | .675" (1.715 cm) |
| Cutter length, "D" | 1.125" (2.858 cm) |
| Cutter second end portion 40, O.D. | 1.0" (2.540 cm) |
| Depth of groove 32 | .010" (2.54 mm) |

In the method of the invention, the tee is positioned about the conduit to be tapped. In the ready position, the cutter 36 is positioned in the second passageway 6 spaced from the conduit 12 and the sleeve 22 is positioned on the cutter 36 as shown in FIG. 2. With the cutter in this position, the condition of the third passageway and any conduit attached thereto can be checked through the test opening 45 of the cutter 36. The cutter 36 is rotated by inserting a suitable tool in the hexagonal shaped tool socket 56 and rotating the cutter 36 for moving the cutter 36 through the second passageway 6 toward the conduit 12 in response to the cutter threads 50 following the threads 52 on the inside of the second passageway 6. Rotation is continued after contact of the cutter's cutting surface 46 with the conduit 12 for cutting a coupon 58 from the conduit 12. Rotation of the cutter 36 is thereafter continued for forcing the sleeve 22 into the wall of conduit 12 between the cutter 36 and the conduit 12 and seating the sleeve flange 24 on the seat 14. Since the forcing of the sleeve 22 into the hole formed by the cutter 36 exerts compressive forces against the material of conduit 12 adjacent the sleeve 22, releasing the compression on that portion of the material adjacent the groove 32 will permit a ring of the plastic material to expand into the groove 32 locking the sleeve 22 in place as shown in FIG. 1. The rotation of the cutter 36 is then reversed and the cutter is moved through the sleeve 22 leaving the sleeve 22 within the conduit cut opening as the cutter with the cut coupon therein is moved to a position adjacent the second end 54 of the second passageway 6. At this location the cutter is sealing the second end 54 of the second passageway 6 and providing a pathway for fluid from within the conduit 12, through a portion of the second passageway 6, and outwardly through the third passageway 8. The presence of the coupon 58 within the cutter precludes any substantial escape of fluid through the small opening 45 and the tool socket 56.

Use of the cutter 36 with the coupon 58 located therein as a means for sealing the second end portion 54 of the second passageway 6 during use of the apparatus and method of the invention is within the scope of the invention and is particularly useful in that capacity while a system attached to a surface line 61 is being checked out following tapping of the main conduit 12. If necessary, the cutter 36 can be moved back toward the conduit 12 in order to cut off the flow of fluid through the tee body 2. For most permanent installations, however, the cap 63 will ordinarily be applied to the second end 54 of the second passageway 6 to provide a permanent fluid-tight seal. Although one advantage of the method and apparatus of the invention is that the cutter 36 can be removed from the tee body 2 prior to installation of the cap 63, it is also within the scope of the invention to leave the cutter 36 within the second passageway 6 so that it will, for example, be readily available for use as an emergency shutoff valve. The passageway 6 is therefore preferably long enough to permit unobstructed flow through the lower portion thereof into the third passageway 8 when retention of the cutter 36 within the second passageway 6 adjacent the second end 54 thereof is desired. The cap 63 is likewise capable of operating to form a fluid-tight seal whether or not the cutter 36 is retained within the second passageway 6.

Since the flange 24 is seated on the seat 14 and extends into the conduit 12, impact forces on the body 2 will be transmitted to the sleeve 22 and conduit 12, and rotation of the body 2 about the conduit 12 will be prevented. By this construction, rotation of the body about the conduit with resultant displacement of the cut opening in the conduit relative to the second passageway 6 will be prevented without exerting extreme pressure forces on the outer surface of the conduit.

In the apparatus of this invention, the sleeve 22 is of cylindrical configuration so that it can be easily forced into the cut opening of the conduit and yet maintain a fluid-tight seal between the sleeve and the cut opening walls while maintaining the sleeve and associated apparatus of a simple construction. The one or more annular grooves about the sleeve provide additional holding means for the sleeve within the cut opening yet permit a simple construction which reduces the time and labor required for construction. To further simplify the construction of the cutter 36 or to provide a cutter 36 which can be utilized on a more permanent basis as a seal for the second end of the second passageway 6 the test opening 45 of the cutter 36 can be omitted with the tool socket 56 being completely isolated from the opening 43.

A cutter 36 suitable for use with the apparatus and method of the invention is preferably made of steel. The sleeve 22 can be made of the same material or of any other suitable metal, plastic, or other hard material with suitable physical properties. For special applications, material such as stainless steel, brass, fiberglass and other similar materials may be used due to their particular strength or resistance to attack by the fluid within the main conduit 12. In general, the material selection should be compatible with the fluid being transported in the main conduit 12 and with the physical strength requirements anticipated at the particular location in which it is installed. The apparatus of the invention is particularly suitable for use with lines transporting natural or manufactured gas, air, water, chemicals, and/or other liquids and gases.

Reasonable modifications and alterations of this invention will become apparent to those skilled in the art from the foregoing discussion and accompanying drawing, and it should be understood that this invention is not to be unduly limited thereto.

What is claimed is:

1. Apparatus for tapping a conduit, said apparatus comprising:
   a body means having first, second, and third passageways extending therethrough, said first passageway being adapted for accepting and maintaining a conduit to be tapped and being in communication with a first end portion of said second passageway, said first end portion of said second passageway additionally being in communication with a first end of said third passageway for providing fluid communication between said first end portion of said second passageway and a second end of said third passageway, said body means also having a seat means located on the inside wall of said first end portion of said second passageway at a location between the opening to said first passageway and the opening to said third passageway;
   a sleeve means having a generally cylindrical tubular body with a first end and a second end and having an annular outwardly extending flange at said first end thereof, said flange being mateable with said seat means; and
   a cutter means for cutting an opening within a conduit located within said first passageway and for inserting said second end of said sleeve means into said opening, said cutter means having a generally cylindrical first end portion which is insertable into said sleeve means and a second end portion which is adapted to engage the inside wall of said second passageway, said cutter means having a passageway extending therethrough from said first end portion to said second end portion thereof.

2. Apparatus in accordance with claim 1 wherein said sleeve means has an annular groove extending about the outer periphery of said tubular body thereof, said groove being located to permit, when said flange is seated against said seat means, contact with said groove by conduit material around the wall of the opening which has been cut in said conduit by said cutting means.

3. Apparatus in accordance with claim 2 wherein said cutting means has a first end located at the extremity of said generally cylindrical first end portion thereof, said first end of said cutter means having a cutting surface formed thereon, said cutting means also having a shoulder located a preselected distance from said cutting surface toward said second end portion of said cutter means, said shoulder being adapted to engage said first end of said sleeve means.

4. Apparatus in accordance with claim 3 wherein the distance between said shoulder of said cutter means and said first end of said cutter means exceeds the length of said sleeve means.

5. Apparatus in accordance with claim 4 wherein the distance between said shoulder of said cutter means and said first end of said cutter means exceeds the length of said sleeve means by at least the wall thickness of the conduit to be tapped.

6. Apparatus in accordance with claim 5 wherein a second end of said sleeve means opposite said first end thereof has a tapered edge with the point of said tapered edge located along the inside diameter thereof.

7. Apparatus in accordance with claim 6 wherein said wall thickness of said tubular sleeve body of said sleeve means is within the range of from about 2 percent to about 10 percent of the outside diameter of said sleeve body.

8. Apparatus in accordance with claim 2 wherein the inner wall of said second passageway is threaded and wherein the outer surface of said second end portion of said cutter means is provided with thread means mateable with the threaded inner wall of the second passageway.

9. Apparatus in accordance with claim 2 wherein the portion of said body forming said first passageway comprises first and second body portions, said first and second body portions being releasably fixed one to the other.

10. Apparatus in accordance with claim 2 wherein the central axis of said first passageway is substantially perpendicular to the central axis of said second passageway.

11. Apparatus in accordance with claim 2 wherein a second end of said sleeve means opposite said first end thereof has a tapered edge with the point of said tapered edge located along the inside diameter thereof.

12. Apparatus in accordance with claim 2 wherein the wall thickness of said tubular body of said sleeve means is within the range of from about 0.015 inch (3.81 mm) to about 0.1 inch (25.4 mm).

13. Apparatus in accordance with claim 2 wherein said wall thickness of said tubular sleeve body of said sleeve means is within the range of from about 2 percent to about 10 percent of the outside diameter of said sleeve body.

14. A method for connecting a service line to a main line, said method comprising:
operably engaging said main line within a first passageway of a tapping means;
inserting a cutter means within a second end portion of a second passageway of said tapping means, said second passageway having a first end portion opposite said second end portion and adjacent said first passageway;
placing said service line in fluid communication with a third passageway of said tapping means, said third passageway of said tapping means also being in fluid communication with said first end portion of said second passageway thereof;
testing said service line communicating with said third passageway by means of an opening extending through said cutter means;
advancing said cutter means through said second passageway from said second end portion to said first end portion thereof to cut an opening in said main line positioned in said first passageway and to insert a sleeve means mounted on said cutter means into the opening so cut; and
withdrawing said cutter means to said second end portion of said second passageway to provide fluid communication between said main conduit and said service line through said first portion of said second passageway and said third passageway.

15. A method in accordance with claim 14 additionally comprising removing said cutter means from said second passageway.

16. A method in accordance with claim 15 additionally comprising forming a fluid-tight seal over an opening in said tapping means following removal of said cutter means therefrom.

17. A method in accordance with claim 14 additionally comprising placing a flange means located on first end portion of said sleeve means in contact with a portion of a tapping means to thereby assist in maintaining said tapping means in a preselected position relative to said conduit.

18. A method in accordance with claim 14 wherein advancing said cutting means through a portion of said tapping means comprises rotating said cutting means in a direction which will cause force to be exerted on a threaded portion of said cutting means by a mating threaded portion of said tapping means.

* * * * *